W. H. PERKINS.
TRAP FOR WASTE WATER PIPES.
APPLICATION FILED DEC. 6, 1915.
1,210,201.
Patented Dec. 26, 1916.
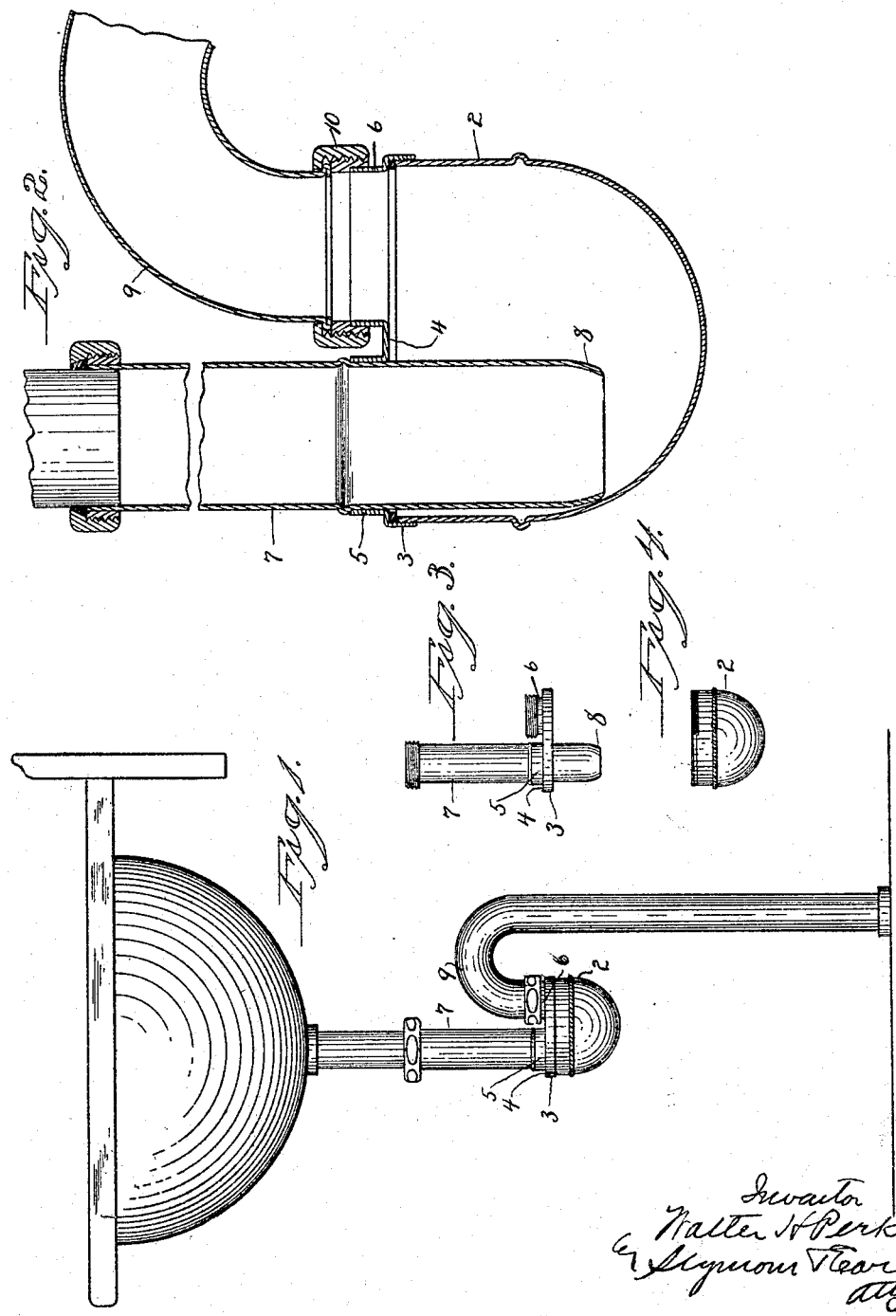

UNITED STATES PATENT OFFICE.

WALTER H. PERKINS, OF WATERTOWN, NEW YORK, ASSIGNOR TO J. B. WISE INC., OF WATERTOWN, NEW YORK, A CORPORATION.

TRAP FOR WASTE-WATER PIPES.

1,210,201. Specification of Letters Patent. Patented Dec. 26, 1916.

Application filed December 6, 1915. Serial No. 65,387.

*To all whom it may concern:*

Be it known that I, WALTER H. PERKINS, a citizen of the United States, residing at Watertown, in the county of Jefferson and State of New York, have invented a new and useful Improvement in Traps for Waste-Water Pipes; and I do hereby declare the following, when taken in connection with the accompanying drawings and the characters of reference marked thereon, to be a full, clear, and exact description of the same, and which said drawings constitute part of this application, and represent, in—

Figure 1 a side view of a waste pipe trap constructed in accordance with my invention and shown in connection with a basin and outlet pipe. Fig. 2 a transverse sectional view on an enlarged scale of my improved trap. Fig. 3 a side view of the top of the trap, detached. Fig. 4 a side view of the body of the trap, detached.

This invention relates to an improvement in traps for waste water pipes, the object being to construct a trap which may be readily and perfectly cleaned, and the invention consists in the construction hereinafter described and particularly recited in the claim.

In carrying out my invention, I employ a cup-shaped trap-body 2. The lower portion of this body is hemispherical with a straight upper wall which is preferably threaded to engage with a flange 3 formed integral with a top 4. This top is substantially flat and formed with an inlet nipple 5 and with an outlet nipple 6. Through the nipple 5 the waste pipe 7 extends, and so as to project into the trap, and preferably and as shown in Fig. 2 of the drawings, the lower end 8 of this waste pipe is contracted. An outlet pipe 9 is connected with a nipple 6 in any desired manner, herein shown by a coupling ring 10.

In the more general construction of waste pipe traps, the trap is provided with a small opening closed by a plug which forms the only means of access to the interior of the trap for cleaning. In my construction the entire trap-body is readily unscrewed from the top so as to permit of thoroughly cleaning when necessary. The advantage of contracting the lower end of the waste pipe 7 is to prevent the flow of water into the trap faster than it can be carried off through the outlet pipe 9, and hence prevents the trap from siphoning, and assures the presence of sufficient water in the trap to form a seal for the waste pipe 7. In my construction the trap-body and cap are formed from sheet metal which reduces the cost of manufacture, and with this construction I avoid the necessity of forming a clean-out in the body and the expense of a plug for that clean-out.

I claim:—

In a non-siphoning sanitary waste-pipe trap, the combination with a disk-shaped trap-cover, of an inlet-pipe mounted therein and extending downwardly therefrom in a substantially straight line, an outlet-pipe also mounted in the said cover and extending upwardly therefrom, the discharge-end of the inlet-pipe being smaller than the receiving-end of the outlet-pipe, and a depending, domical trap-body removably connected with the said cover and housing the discharge-end of the inlet-pipe, whereby siphoning is avoided, and whereby when the said domical body is removed from the said cover, the inlet-pipe, being straight, may be readily cleaned.

WALTER H. PERKINS.

Copies of this patent may be obtained for five cents each, by addressing the "Commissioner of Patents, Washington, D. C."